(12) United States Patent
Hillsdon

(10) Patent No.: US 6,540,178 B1
(45) Date of Patent: Apr. 1, 2003

(54) SOLAR CELL ARRAY ORIENTATION IN AN AIRSHIP

(75) Inventor: Reginald H. Hillsdon, Northamptonshire (GB)

(73) Assignee: Advanced Technologies Group Limited, Bedfordshire (GB)

( * ) Notice: Subject to any disclaimer, the term of this patent is extended or adjusted under 35 U.S.C. 154(b) by 0 days.

(21) Appl. No.: 09/913,127

(22) PCT Filed: Feb. 8, 2000

(86) PCT No.: PCT/GB00/00377

§ 371 (c)(1),
(2), (4) Date: Nov. 20, 2001

(87) PCT Pub. No.: WO00/47466

PCT Pub. Date: Aug. 12, 2000

(30) Foreign Application Priority Data

Feb. 9, 1999 (GB) .............................................. 9902873

(51) Int. Cl.[7] .............................. B64B 1/02; B64B 1/22
(52) U.S. Cl. ............................ 244/30; 244/93; 244/127

(58) Field of Search .............................. 244/29, 30, 31, 244/96, 127, 93

(56) References Cited

U.S. PATENT DOCUMENTS 3,971,533 A * 7/1976 Slater .......................... 244/30

FOREIGN PATENT DOCUMENTS

| GB | 2250007 A | * | 5/1992 | ................... 244/29 |
| SU | 1740249 A1 | * | 6/1992 | ................... 244/30 |

* cited by examiner

Primary Examiner—Robert P. Swiatek
(74) Attorney, Agent, or Firm—Dann, Dorfman, Herrell and Skillman; Henry H. Skillman

(57) ABSTRACT

An airship (1) comprising gas envelope means for providing in use a hull (2) with a generally longitudinally extending longitudinal axis (20) and solar cell array means (3) arranged in use to be mounted on the outside of the hull (2). The solar array means (3) are arranged in use to extend around only a part of the circumference of the hull (2) and are turned about the longitudinal hull axis (20) to control the amount of incident solar radiation collected by the solar cell array means (3).

9 Claims, 4 Drawing Sheets

SOLAR CELL ARRAY ORIENTATION IN AN AIRSHIP

TECHNICAL FIELD

This invention relates to an airship provided with solar cell array means and to a method of orientating inflight solar array means mounted on an airship.

BACKGROUND OF THE INVENTION

Since an airship uses only a small amount of energy for propulsion, it is inherently suitable to be powered by solar energy derived from arrays of solar cells mounted on the airship. For many airship applications, including very long endurance unmanned roles, it can be postulated that solar energy is the only practical energy medium acceptable under current ecological agreements for powering such airships.

It is a property of a solar cell that it has maximum efficiently when the incident solar irradiation is normal, i.e. at 90°, to the cell. In order to capture sufficient energy for powering purposes, it is necessary to mount a large number of solar cells on the airship, for example mounted as a number of arrays secured to the outside body of the airship. Since, for aerodynamic reasons, an airship is usually shaped in the form of body of revolution, the different solar cells will face in different directions at any one time and thus only some of the solar cells will receive the maximum amount of incident solar radiation at any one time. Thus with large arrays of solar cells on the surface of an airship, many solar cells will receive less than maximum energy. Indeed in certain conditions, any solar cell on "the dark side" of the airship facing away from the sun will receive virtually no solar radiation, except a small quantity of reflected solar radiation.

Furthermore, since any airborne airship must be assumed capable of flying a random course, it cannot be guaranteed that solar radiation will occur over a predictable range of azimuth angle.

This leads to a situation where, up to the present time, airship designers have found it necessary, in order to be able to provide sufficient power to operate an airship, to cover the majority of the airship hull surface with solar cells to ensure that sufficient power can be generated whichever way the airship is directed and wherever the sun is positioned relative to the airship. In practice, when an airship is positioned to receive solar radiation, typically less than half the total number of solar cells of a conventionally arranged cell array mounted on the external surface of the airship collect energy at any one time. This is clearly a highly inefficient system both in terms of cost but, more importantly, in the weight of large solar cell arrays. At high operating altitudes weight is absolutely critical and any weight savings can be crucial in achieving a "buoyant" airship.

There have been many proposed solar powered airships, and a good deal of published work. Most authors accept the limitations of latitude and weather conditions which mitigate against practical use of solar airships. So far as is known, no solar powered airship has succeeded.

A known solar powered aircraft is known from U.S. Pat. No. 5,518,205. This known aircraft has a pair of inflated hulls which are connected by forward and rear wings and from which a gondola is supported by suspension wires. The forward wing carries a solar cell array on its upper surface. By adjusting the position of the gondola the aircraft can be made to bank to optimize exposure of the solar cell array to incident solar radiation. The aerodynamics of such an aircraft are of course considerably altered by the banking of such a twin-hulled aircraft.

DISCLOSURE OF THE INVENTION

It is an aim of the present invention to reduce the number of solar cells required on an airship for the power requirements, e.g. providing propulsion, of the airship.

It is another aim of the present invention to provide means for changing the orientation of solar cell array means mounted on the hull of an airship in order to increase, and preferably to maximize, the amount of solar radiation collected by the solar cell array means.

According to one aspect of the present invention, there is provided an airship comprising gas envelope means for providing in use a hull with a generally longitudinally extending longitudinal axis and solar cell array means arranged in use to be mounted on the outside of the hull, characterized in that the solar array means are arranged in use to extend around only a part of the circumference of the hull, and in that means are provided for turning, in use, the solar cell array means about the longitudinal hull axis to increase the amount of incident solar radiation collected by the solar array means.

By providing means for turning the solar array means about the longitudinal hull axis, the solar array means are able to "track" the sun as it moves across the sky. For example, the solar array means will be turnable through an arc, about the longitudinal hull axis, between end positions offset on opposite sides of the centre of buoyancy of the airship.

The solar cell array means is preferably rigidly attached to the airship hull, for example, to an upper quarter of the airship hull. In this case the turning means is operable to cause the entire hull to roll to enable the solar array means to track the sun as it traverses across the sky. Although it is preferred for the solar array means to be rigidly attached to the airship hull, the present invention is not so limited and is intended to cover solar cell array means movable relative to the airship hull.

The solar array means extends along a sufficient length of the hull to provide the required area of array for the basic power requirements of the airship.

Preferably the turning means for effecting turning of the solar cell array means includes movable weight means, the centres of gravity of the solar cell array means and the weight means being positioned on opposite sides of the centre of buoyancy of the airship. Thus the weight of the solar cell array means and of the weight means counteract or counterbalance each other and prevent a permanent rolling force acting on the airship. By changing the "lateral offset" of the weight means (i.e. the distance between the centre of gravity of the weight means and a vertical plane passing through the centre of buoyancy of the airship), the airship is caused to roll thereby also turning the solar array means fixedly mounted to the airship hull.

In order to maximize weight saving, the weight means preferably comprises a payload module of the airship which can be laterally offset to counter the weight of the array. Since the airship is designed to carry a payload, no additional weight means are required to off-set the weight of the solar array means.

In certain high altitude designs, the payload module may be completely contained within the hull. Thus the airship can be configured in a pendulum stable manner for a particular pointing direction of the solar array means. The payload module is conveniently mounted for movement in an arc about the centre of buoyancy. Thus movement of the payload module along the arc causes the airship to roll about its longitudinal axis until the centre of gravity of the complete vehicle is once again directly below the centre of buoyancy. By moving the payload module in an arc below the centre of buoyancy, pendulum stability can be maintained. Using this system it is possible to achieve turning of the solar array means of in-excess of 90 degrees. This allows the airship not only to align the solar array means as the sun moves through the sky over the daylight hours, but also to allow for the airship to fly in the opposite direction (for prevailing wind and station keeping requirements to be met) and still maintain the solar array means on the sun facing side of the airship. This is particularly important at the higher latitudes of operation.

Conveniently the turning means includes cable and winch means. Typically the cable and winch means comprises a series of small winches pulling in/playing out cables that make up suspension means for suspending the payload module from the airship hull. The control of operating the cable and winch means would form an integral part of the overall flight control system of the airship.

According to another aspect of the present invention there is provided a method of orientating in-flight solar array means mounted externally on a hull of an airship to increase the amount of incident solar radiation collected by the solar cell array means.

BRIEF DESCRIPTION OF THE DRAWINGS

An embodiment of the invention will now be described, by way of example only, with particular reference to the accompanying drawings, in which.

MODES FOR CARRYING OUT THE INVENTION

Figure 1:
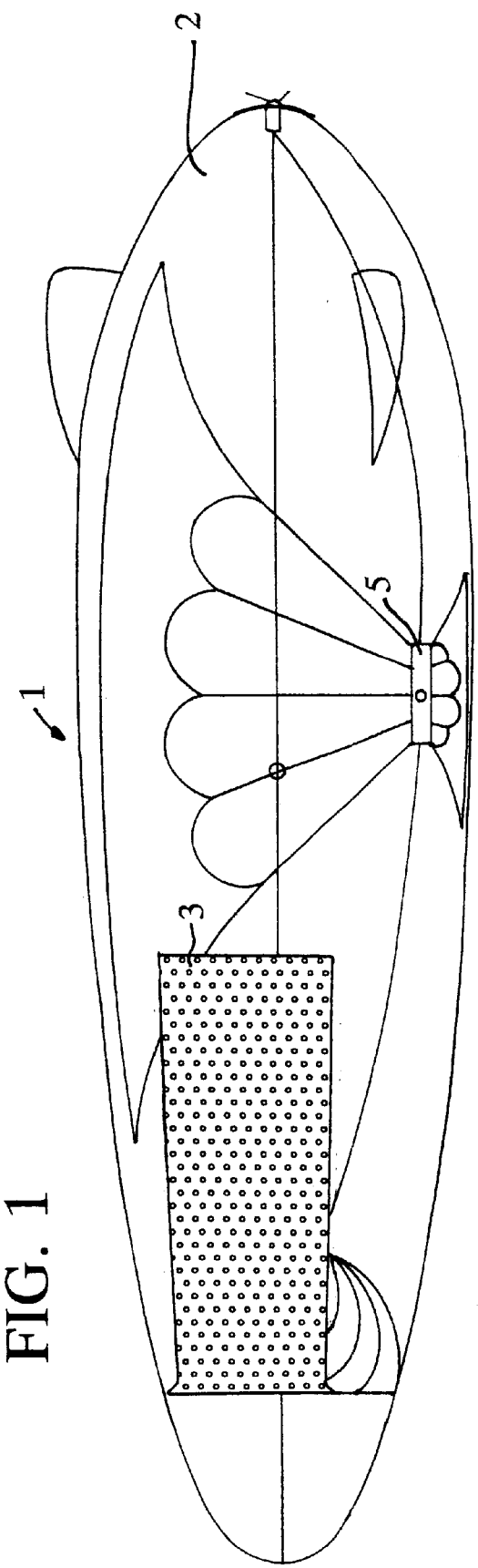
FIG. 1 is a schematic view of a stratospheric airship in-flight.

FIG. 1 is a schematic view of a stratospheric airship 1 in flight. The airship 1 has a single hull 2 formed from a gas envelope filled with a lighter than air gas, typically helium. Hereinafter reference will be made to helium as the gas filling the envelope although it will be appreciated that other gases could be used. At least one array 3 of solar cells is fixedly mounted to the hull 2. As shown the solar cell array 3 extends just over a quarter of the circumference of the hull 2 and is positioned at the front end of the airship. When launched, the gas envelope of the hull is only partially filled with helium, typically only about 6–8% of the final volume of the hull 2 being filled with helium, and the airship will not have the "inflated" shape shown in FIG. 1. After launch of the partially gas-filled airship, the helium gradually expands as the airship ascends through the atmosphere to its operating altitude, e.g. about 70,000 feet. At the operating altitude the airship has the shape and form shown schematically in FIG. 1.

Figure 2A:
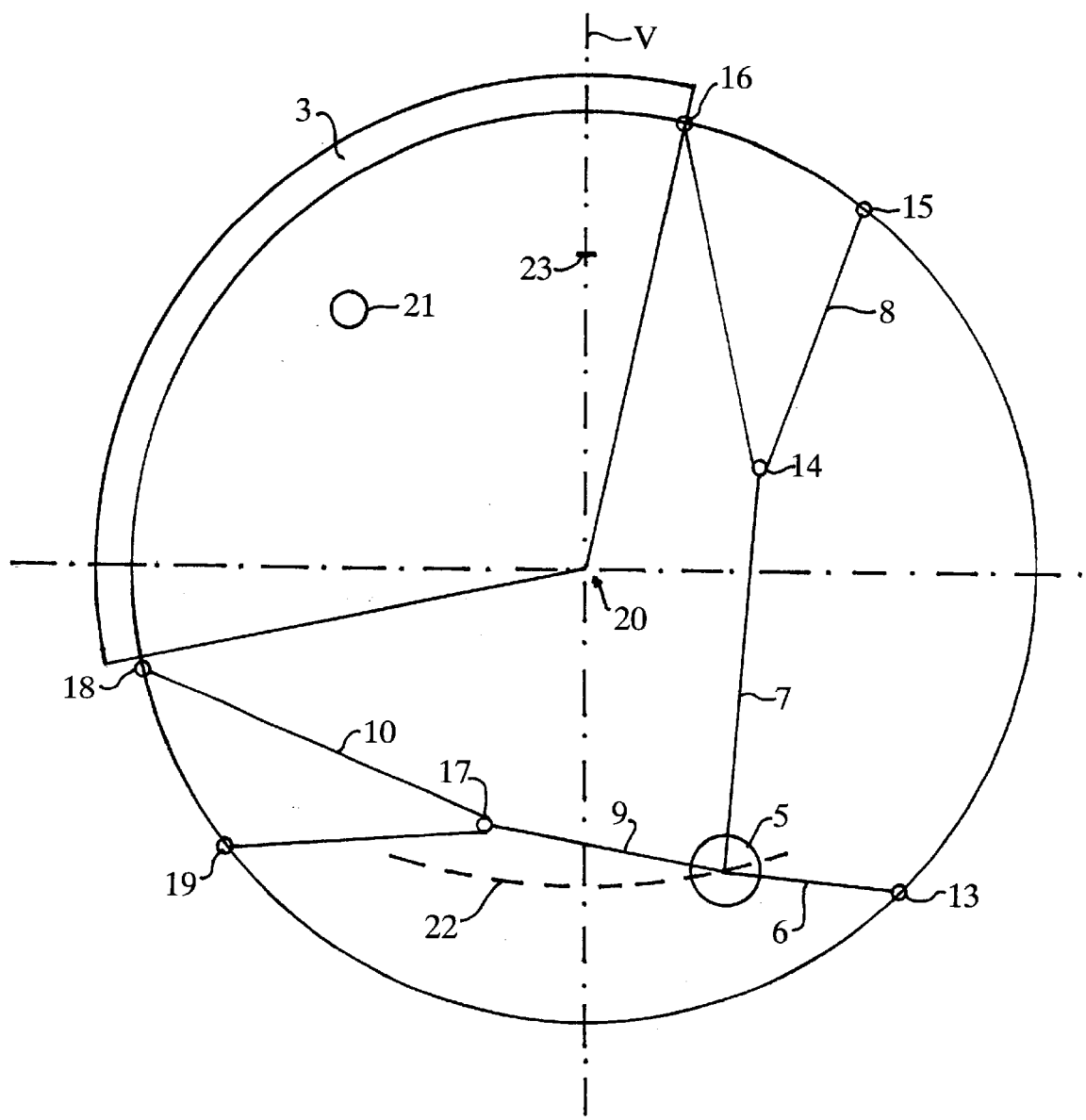
FIGS. 2a, 2b and 2c are schematic views illustrating how the airship of FIG. 1 can be rolled to re-orientate solar array means mounted on the outside of the. airship.
Figure 2B:
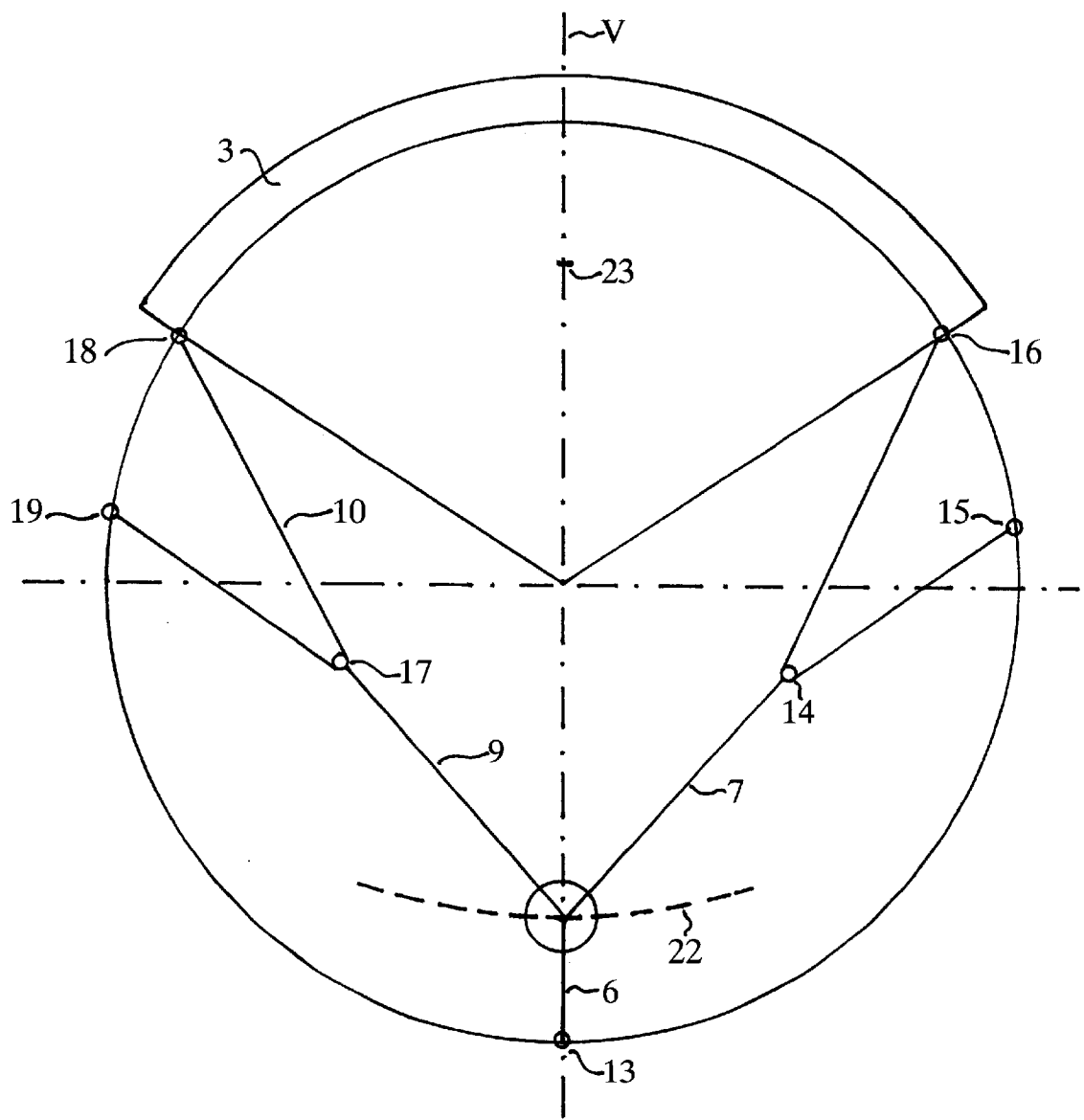
Figure 2C:
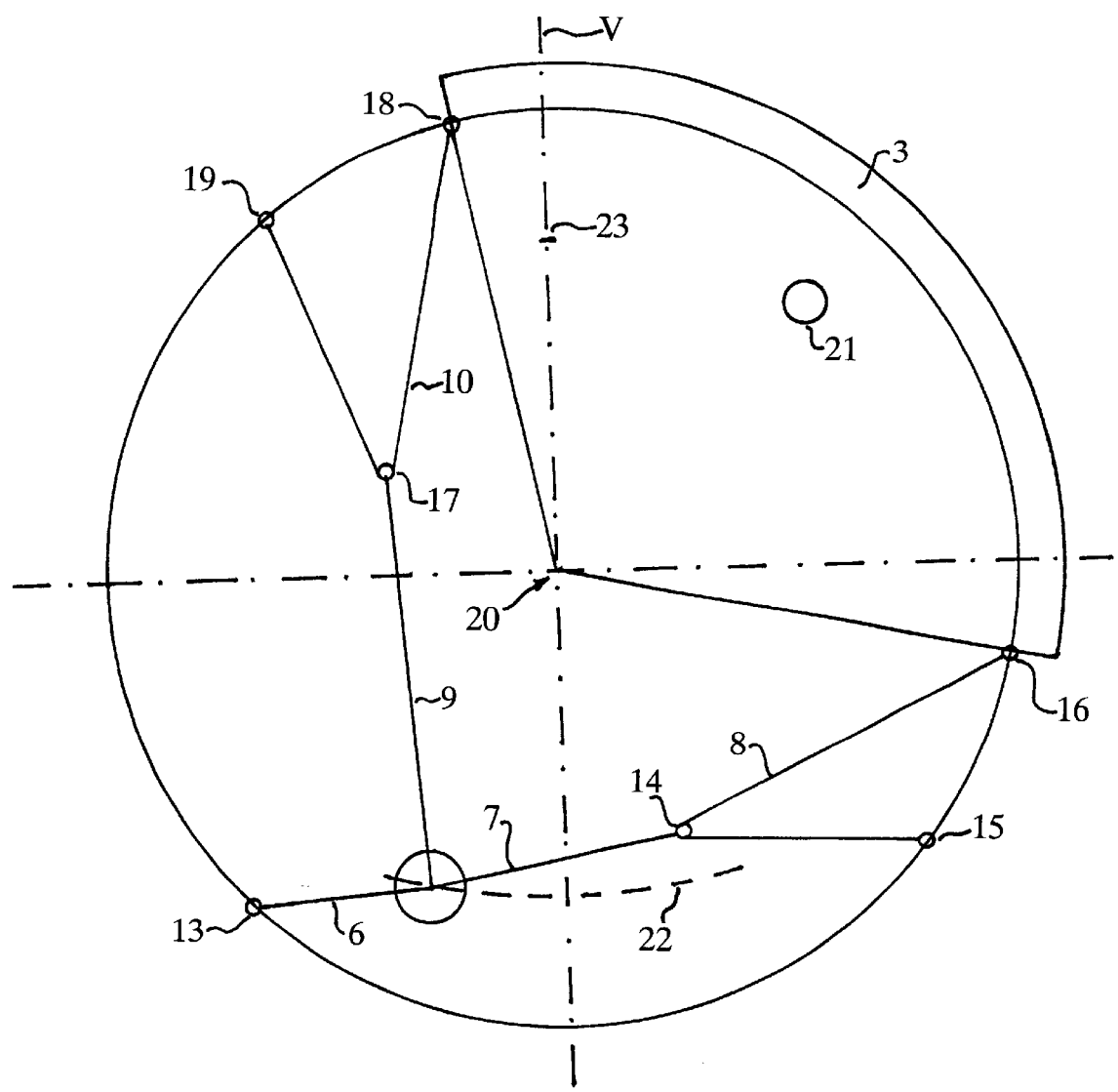

The airship 1 has an internal payload arranged in a gondola 5 (see FIGS. 2a–c). The gondola is attached to the hull 2 by means of cables 6–10. Cable 6 extends from the gondola 5 to an attachment point 13 on the hull 2. Cable 7 extends from the gondola to a pulley 14 around which cable 8 runs with its opposite ends connected to the hull at attachment points 15 and 16. Cable 9 extends from the gondola 5 to a pulley 17 around which cable 10 runs with its opposite ends connected to the hull at attachment points 18 and 19. Winches (not shown) are provided at the gondola for changing the length of the cables 6, 7 and 9.

In the position shown in FIG. 2a, the solar cell array 3 is mounted to the left of a vertical plane V passing through a longitudinal axis 20 of the airship 1. The centre of gravity 21 of the solar cell array 3 is also positioned to the left of the axis 20 and the weight of the array is balanced by the gondola 5 positioned to the right of the longitudinal axis 20. The airship is thus in a stable condition with the weights of the array 3 and the gondola 5 counteracting any tendency of the airship to roll.

The airship can be made to roll by moving the gondola beneath the axis 20 towards the vertical plane V. As shown in the drawings, the gondola 5 is moved along an arcuate path 22 centred on point 23 in the vertical plane V. Movement of the gondola is by operation of the winches (not shown) on the gondola 5. In particular the winches are operated to shorten cables 6 and 7 and to lengthen cable 9 during reorientation of the solar cell array 3 to the position shown in FIG. 2b. In FIG. 2b, the centre of gravity 21 of the array 3 and of the gondola 5 are positioned in the vertical plane V on opposite sides of the longitudinal axis 20. The hull of the airship has been turned through approximately 45° and the solar cell array is positioned facing upwardly to receive solar incident radiation falling on it from directly above the airship.

If the winches are now operated to increase the lengths of cables 6 and 9 and to reduce the length of the cable 7, the gondola 5 is moved leftwards (as viewed in the Figures) away from the vertical plane V and the hull 2 turns or rolls in a clockwise direction. FIG. 2c shows the hull 2 and array 3 in their other endmost position.

By suitable operation of the winches the hull 2 can be made to roll in the counter-clockwise direction to the position shown in FIG. 2a ready for receiving incident solar radiation at dawn the following day.

It will be appreciated that the position of the gondola 5 is controlled to roll the airship to orientate the solar cell array 3 as required. Thus by continual control of the winches, which are controlled to pull in and pay out the cables, the array 3 can be made to track the sun as it passes over the sky. Thus the position of the solar cell array 3 is controlled, preferably to maximize or increase the amount of incident radiation collected by the solar cell array. The control of the winches forms part of an overall airship flight control system which would also be receiving other control information relevant to the control of the airship, such as the position of other control surfaces, the operation of thrust vectoring systems and the like.

The use of a single hull airship of the type described allows the hull to be rotated or turned about its longitudinal axis through relatively large angles, e.g. up to and in excess of 90°. Since an airship is essentially in the form of a body of revolution, the aerodynamics of the airship are not altered by a great amount or to a significant extent by being turned about its longitudinal axis.

Although the invention has been described with reference to non-rigid airships, it also has application to other types of airship. For example, a solar cell array could be movably mounted on a hull of a rigid or semi-rigid airship for movement relative to the hull to track the sun traversing the sky.

The invention is intended to cover both an airship in flight and on the ground in an uninflated condition. The term "airship" is thus intended to embrace an airship with an uninflated or partially inflated envelope.

What is claimed is:

1. An airship (1) comprising gas envelope means for providing in use a hull (2) with a generally longitudinally extending longitudinal axis (20) and solar cell array means (3) arranged in use to be mounted on the outside of the hull (2) so as to extend around only a part of the circumference of the hull (2), wherein weight transfer means (6–10) are provided for turning, in use, the solar cell array means (3) about the longitudinal hull axis (20) to control the amount of incident solar radiation collected by the solar cell array means (3).

2. An airship according to claim 1 wherein said solar array means (3) is mounted so as to be turned to a position which maximizes the amount of incident solar radiation collected.

3. An airship according to claim 1, wherein the solar cell array means (3) is rigidly attached to the airship hull (2).

4. An airship according to claim 3, wherein the solar cell array means (3) extends along a sufficient length of the hull (2) to provide the required area of array for the basic power requirements of the airship.

5. An airship according to claim 1, wherein the weight transfer means for effecting turning of the solar cell array means (3) includes movable weight means (5), the centres of gravity of the solar cell array means (3) and the weight means (5) being positioned on opposite sides of a vertical plane passing through the longitudinal axis (20) or buoyancy axis of the airship.

6. An airship according to claim 5, wherein the weight means (5) comprises a payload module of the airship which can be laterally offset to counter the weight of the array means (3).

7. An airship according to claim 6, wherein the payload module (5) is contained completely within the hull (2).

8. An airship according to claim 1, wherein said weight transfer means (6–10) includes cable and winch means.

9. An airship according to claim 8, wherein the cable and winch means comprises a series of winches for pulling in and paying out cables (6, 7, 9) that make up suspension means for suspending weight means (5) from the airship hull (2).

* * * * *